US010924020B1

(12) United States Patent
Perry et al.

(10) Patent No.: US 10,924,020 B1
(45) Date of Patent: Feb. 16, 2021

(54) PRESTART CONTROL CIRCUIT FOR A SWITCHING POWER CONVERTER

(71) Applicant: Raytheon Company, Waltham, MA (US)

(72) Inventors: Marty Perry, Tucson, AZ (US); Robert J. Schaller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/527,897

(22) Filed: Jul. 31, 2019

(51) Int. Cl.
*H02M 3/335* (2006.01)
*H02M 1/36* (2007.01)

(52) U.S. Cl.
CPC ......... *H02M 3/33507* (2013.01); *H02M 1/36* (2013.01); *H02M 3/33592* (2013.01)

(58) Field of Classification Search
CPC ......... H02M 3/33507; H02M 3/33592; H02M 3/1588; H02M 3/156; H02M 3/1563; H02M 3/158; H02M 3/1584; H02M 1/36; H02M 1/088; H02M 1/14; H02M 1/143; H02M 1/15; H02M 1/38; H02M 1/32; H02M 2001/0016; H02M 2001/0025; H02M 2001/385; H02M 2001/0045; H02M 2001/0048; H02M 2001/0058; H02M 2001/0032; H02M 2001/0038; H02M 2001/004; H02M 2003/1566
See application file for complete search history.

(56) References Cited

U.S. PATENT DOCUMENTS

| 6,618,274 | B2 | 9/2003 | Boylan et al. |
| 6,912,138 | B2 | 6/2005 | Perry et al. |
| 8,213,192 | B2 | 7/2012 | Konecny et al. |
| 8,242,762 | B2 | 8/2012 | Bhagwat et al. |
| 8,358,117 | B1 | 1/2013 | Chui et al. |
| 8,373,403 | B1 | 2/2013 | Radovic |
| 8,963,520 | B1 | 2/2015 | Leone et al. |
| 9,780,635 | B1 * | 10/2017 | Lam ........................ H02M 1/00 |

(Continued)

FOREIGN PATENT DOCUMENTS

WO WO-2017168220 A1 10/2017

OTHER PUBLICATIONS

"International Application Serial No. PCT/US2020/031658, International Search Report dated Aug. 21, 2020", 4 pgs.

(Continued)

*Primary Examiner* — Thienvu V Tran
*Assistant Examiner* — Nusrat Quddus
(74) *Attorney, Agent, or Firm* — Schwegman Lundberg & Woessner, P.A.

(57) ABSTRACT

The present invention provides a prestart control circuit that measures a reflected voltage on the primary side of a switching power converter. The prestart control circuit pulses the synchronous rectifier switch OPEN and CLOSED, which allows a measurement of the reflected voltage on the primary side of the switching power converter. The reflected voltage is proportionate to the output voltage of the switching power converter. The prestart control circuit uses the reflected voltage to establish the initial duty cycle of the switching power converter. The switching power converter may be any converter that includes a synchronous rectifier, such as a flyback converter or a forward converter, in a single-ended, double-ended and/or multi-phased configuration.

24 Claims, 5 Drawing Sheets

(56) References Cited

U.S. PATENT DOCUMENTS

| | | | |
|---|---|---|---|
| 10,158,297 B1* | 12/2018 | Gong | H02M 3/33592 |
| 10,418,905 B1* | 9/2019 | Perry | H03F 3/217 |
| 2006/0152203 A1* | 7/2006 | Perry | H02M 3/33507 |
| | | | 323/283 |
| 2010/0013307 A1 | 1/2010 | Heineman et al. | |
| 2011/0316518 A1 | 12/2011 | Feng et al. | |
| 2013/0020867 A1* | 1/2013 | Hughes | H02M 3/33507 |
| | | | 307/17 |
| 2015/0326120 A1 | 11/2015 | Kelin et al. | |
| 2018/0013348 A1 | 1/2018 | Paul et al. | |

OTHER PUBLICATIONS

"International Application Serial No. PCT/US2020/031658, Written Opinion dated Aug. 21, 2020", 10 pgs.

\* cited by examiner

PRESTART CONTROL CIRCUIT FOR A SWITCHING POWER CONVERTER

BACKGROUND OF THE INVENTION

Field of the Invention

This invention relates to a switching power converter that measures a reflected voltage on the primary side of the switching power converter that is proportionate to the output voltage of the switching power converter and using the reflected voltage during the switching power converter's operations.

Description of the Related Art

Switching power converters are currently used in numerous applications of power systems. These converters are devices that convert a direct current (DC) input voltage into a predetermined DC output voltage. A typical switching power converter has an energy storage section, a switching control circuit such as a pulse width modulator (PWM), a primary switch, and a rectifier. The energy storage section is responsive to the selective application of the input voltage to produce a current and the output voltage. The switching control circuit, primary switch and rectifier control the application of the input voltage to the energy storage section to set the value of the output voltage. The input voltage side of the power converter is typically referred to as the primary side and the output voltage side of the power converter is typically referred to as the secondary side.

An isolated switching power converter has an isolation barrier between the input voltage and the output voltage. The isolation barrier refers to electrical isolation meaning there is no direct conductive path between the input voltage and the output voltage. The electrical isolation may be required for the isolated switching power converter including safety, grounding or noise issues. Due to the isolation barrier, the output voltage is not directly measurable and unknown to the primary side unless additional circuitry is added.

Synchronous rectification has become a desirable alternative to passive rectifiers in power converters due to the increased power conversion efficiency that results at least in part from reduced power losses and higher density. However, while diodes only permit current flow in one direction, synchronous rectifiers such as MOSFETs, or other equivalent semiconductor switches permit current flow in either direction. An additional consideration in an isolated switching power converter with a synchronous rectification on the secondary side of the power converter needs to be addressed as the switching control signal will also cross the isolation barrier. The isolation of the switching control signal for the synchronous rectification can be done in a variety of ways such as an optocoupler or pulse flyback transformer to communicate across the barrier.

A typical isolated switching power converter having a flyback topology includes at least one coupled inductor primarily called a flyback transformer. The flyback transformer is an indcutor with at least two isolated magnetically coupled windings. The windings of the flyback transformer are electrically isolated and provide the isolation barrier. The inductor could be an air core, based on a gapped soft ferrite or other distributed gapped material. The core—if used-provided a means for directing magnetic flux. The typical isolated switching power converter also includes a least one primary switch on the primary side and at least one synchronous rectifier on the secondary side. During normal operations, when the primary switch is CLOSED and the synchronous rectifier is OPEN, the primary side of the flyback transformer is directly connected to the input voltage. The primary side current and the flyback transformer's magnetic flux increases, storing energy in the flyback transformer by setting up the magnetic field in which energy is stored in the air gap of the core. Since the synchronous rectifier is OPEN, there is no current flow out of the flyback transformer to the secondary side and the output capacitor supplies energy for the output voltage. When the primary switch is OPEN, the magnetic field drops, transferring the energy to the secondary winding and now with the synchronous rectifier CLOSED the energy recharges the capacitor and supplies the output voltage.

A problem common in many switching power converters employing synchronous rectification is therefore the drawing of current from a pre-existing voltage, or pre-biased output voltage, also known as reverse bias or back bias, during certain sequences such as startup or shutdown conditions. Pre-biased voltage may come from other power sources in a non-isolated system, or may come from a load. During a soft-start condition, the synchronous rectifiers may have a high duty ratio for the duration of the output voltage rise time of the power supply. Where a pre-biased voltage exists, a reverse current may exist, which may cause the output voltage to drop and correspondingly disturb other elements in the system. Additionally in an isolated switching power converter there is no conductive path through the switching power converter for a detection of a pre-biased voltage. Additional circuitry such as an optocoupler or signal transformer would need to be added to the power converter and this addition is not always an option due to potential issues such as practicality size and space of the necessary circuitry or functional parameters of the power converter.

U.S. Pat. No. 6,618,274 entitled "Synchronous rectifier controller to eliminate reverse current flow in a DC/DC converter output" discloses a control scheme for a synchronous rectifier converter that prevents substantial reverse current flow in all modes of operation without disabling the synchronous rectifiers. Rather than disable the synchronous rectifier altogether to stop the flow of reverse current in light-load, startup, or shutdown conditions, the secondary synchronous rectifier is always enabled, operating either in the fully-synchronous mode or the partially-synchronous mode. The transition between the two operating modes is determined by sensing a system parameter. For example, this parameter can be based on the amount of reverse current that would disrupt the bus to which the converter output is connected, or it could be based on the heat created by the reverse current flow in the power converter when heat dissipation is a concern. In the partially synchronous mode, a duty cycle of the synchronous rectifier switch is modified to turn off the synchronous rectifier before the output current goes negative. The control scheme effectively limits substantial reverse current flow while also improving efficiency by eliminating the need for discrete diodes, yet retaining the benefit of synchronous rectification throughout the operating range of the converter.

U.S. Pat. No. 6,912,138 entitled "Synchronous rectifier control circuit" discloses a synchronous rectifier control circuit for controlling a synchronous rectifier of a power converter. In one embodiment, the conduction of the synchronous rectifier is controlled in proportion of the differentiated output voltage. This embodiment involves increasing the rate of a voltage level of the control signal to the synchronous rectifier.

U.S. Pat. No. 8,373,403 entitled "Circuit for Controlling Synchronous Rectifiers during Start-up into Pre-Bias Output Voltage" discloses a power supply that includes circuitry for gradually enabling switching rectifiers during a startup condition without drawing current from a pre-biased power supply output. A driver provides a control signal to a synchronous rectifier. A driver supply circuit is coupled across the driver and has a first input receiving pulse signals provided by a pulse modulation controller, an output providing supply voltage to the driver, a second input receiving driver supply input voltage, and circuitry defining a time constant. The circuitry includes a first switching element that turns on when pulse signals are provided and a second switching element connected to the output. The time constant is associated with a rise time for the power supply, and defined by selected component values, such that the second switching element only becomes fully conductive after elapsing of the time constant.

U.S. Pat. No. 8,213,192 entitled "Primary Side Sensing for Isolated Fly Back Converters" discloses a switching voltage regulator that samples signals corresponding to a flyback voltage on an auxiliary winding on a primary side of the switching voltage regulator. The flyback voltage functions as feedback from the output voltage on the secondary side. On detection of presence of the flyback voltage, samples corresponding to the flyback voltage are stored until the flyback voltage falls below a threshold voltage. A history of N samples of the flyback voltage is thus maintained. A sample older than the most recently stored sample is used to generate control for generation of the output voltage of the switching voltage regulator. Use of the older sample ensures that the flyback voltage sample used is one that is close to, but before the current in the secondary winding goes to zero.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a prestart control circuit that measures a reflected voltage on the primary side of a switching power converter. The prestart control circuit pulses the synchronous rectifier switch OPEN and CLOSED, which allows a measurement of the reflected voltage on the primary side of the switching power converter. The reflected voltage is proportionate to the output voltage of the switching power converter.

In one embodiment, the primary side of a switching power converter has a primary winding and the reflected voltage is measured across the primary winding.

In one embodiment, the primary side of a switching power converter has a primary winding and an auxiliary winding and the reflected voltage is measured across the auxiliary winding.

In one embodiment, the reflected voltage is used to establish an initial duty cycle value of switching control circuit.

The switching power converter may be any converter that includes synchronous rectifiers, such as a buck converter, boost converter, flyback converter and a forward converter, in a single-ended, double-ended and/or multi-phased configuration These and other features and advantages of the invention will be apparent to those skilled in the art from the following detailed description of preferred embodiments, taken together with the accompanying drawings, in which:

DETAILED DESCRIPTION OF THE INVENTION

The present invention provides a prestart control circuit that measures a reflected voltage on the primary side of a switching power converter. The prestart control circuit pulses the synchronous rectifier switch OPEN and CLOSED, which allows a measurement of the reflected voltage on the primary side of the switching power converter. The reflected voltage is proportionate to the output voltage of the switching power converter. In one embodiment, the reflected voltage is used to establish an initial duty cycle value of switching control circuit.

It is to be understood that the figures and descriptions of the present invention have been simplified to illustrate elements that are relevant for a clear understanding of the present invention, while eliminating, for purposes of clarity, other elements of a conventional switching power converter. For example, certain switching power converters require a transformer reset mechanism. However, such reset mechanisms are not described herein. Those of ordinary skill in the art will recognize, however, that these and other elements may be desirable in a typical switching power converter. However, because such elements are well known in the art, and because they do not facilitate a better understanding of the present invention, a discussion of such elements is not provided herein.

All circuit components are assumed ideal for the purpose of describing the present invention. In addition, as used herein, the term "ON" is used synonymously with "CLOSED," and the term "OFF" is used synonymously with "OPEN" when referring to the state of a semiconductor switch. Also, as used herein, a semiconductor switch is "ON" when the switch reaches a low-impedance state after the control signal to the switch reaches a suitable voltage level to initiate turn-on of the switch. Similarly, a switch is "OFF" when the switch reaches a high-impedance state after the control signal reaches a suitable level to initiate turn-off of the switch. Additionally, as used herein, "PRESTART" operation is starting the switching power converter 100 in an unknown condition including but not limited to the potential for pre-bias voltage. In addition, as used herein, a waveform is "HIGH" when the signal is ON or producing a logic "1". Similarly, a signal or waveform is "LOW" when the signal is OFF or producing a logic "0".

Without loss of generality, the invention will now be described in context to an isolated switching power converter; however, the same principles apply to a non-isolated switching power converter. During normal operations, the primary switch and the synchronous rectifier switch operate in opposition to each other to charge and discharge the energy storage section to produce the desired output voltage (Vout) from the input voltage (Vin). However, during pre-bias conditions, there is a potential to disturb or damage components of the switching power converter with uncontrolled current flowing back into the converter. To limit damage such as current flow back into the switching power converter due to potential pre-bias conditions, the switching power converter implements an additional operation called PRESTART before it begins normal operations. During PRESTART operation, the prestart control circuit measures the reflected voltage that appears on the primary side that is proportionate to the output voltage of the switching power converter and establishes an initial value for the duty cycle of the switching control circuit.

Figure 1:
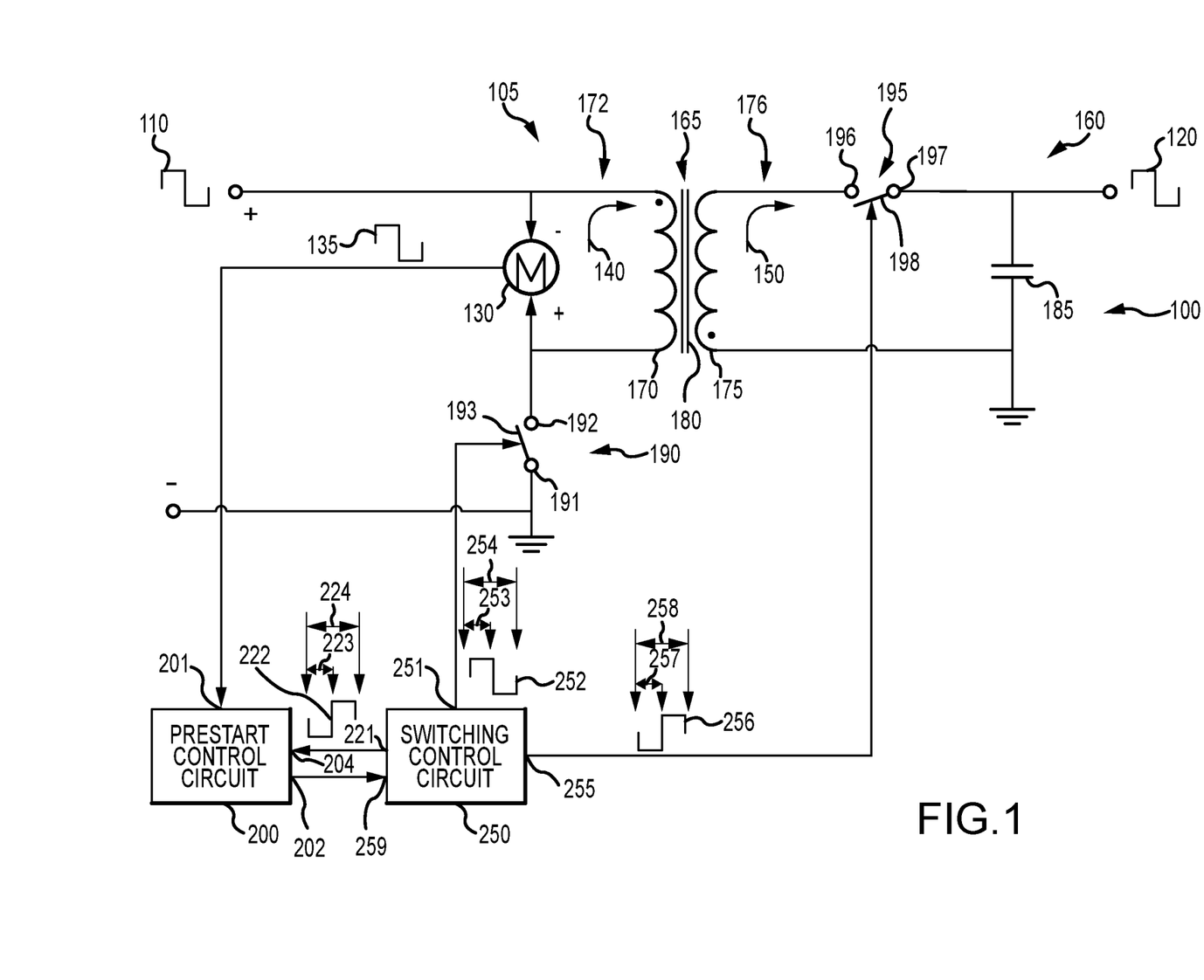
FIG. 1 is a diagram of a switching power converter according to one embodiment of the present invention.

Referring now to FIG. 1, one embodiment of the switching power converter 100 includes a switching power converter 100 having a flyback topology often called a flyback converter 105, a switching control circuit 250 and a prestart control circuit 200.

The switching control circuit 250 creates waveforms 222, 252, 256 that control the switching frequency of the switching power converter 100. The waveforms 222, 252, 256 are rectangular having a period 224, 254, 258 and a duty cycle 223, 253, 257. The frequency of the switching power converter 100 is equal to the inverse of the period 224, 254, 258. The illustrated switching control circuit 250 has an input 259 and three outputs 221, 251, 255. The input 259 of the switching control circuit 250 is connected to the output 202 of the prestart control circuit 200. The prestart control circuit 200 sets the duty cycle 223, 253, 257 and period 224, 254, 258 of the waveforms 222, 252, 256. The function of the prestart control circuit 200 is described below. The output of the switching control circuit 250 may control one or more primary switches 190, one or more synchronous rectifier switches 195 and any waveforms 222 used by the prestart control circuit. In one embodiment, the switching control circuit 250 may be configured to include a pulse width modulator (PWM) integrated chip. In another embodiment, the switching control circuit 250 may include an internal clock that sets the normal operation duty cycle or operating frequency of the switching power converter 100. In another embodiment, the switching control circuit 250 may include an error amplifier in combination with the PWM integrated chip. In another embodiment, the switching control circuit provides the prestart control circuit a waveform to control an analog to digital converter or alternate sampling circuitry.

FIG. 1 shows a switching power converter 100 having a flyback topology and is often called a flyback converter 105. The illustrated flyback converter 105 includes a primary switch 190, a synchronous rectifier switch 195 and an energy storage section 160. The energy storage section 160 in a flyback converter 105 includes a flyback transformer 165 and an output capacitor 185. The flyback transformer 165 is a coupled inductor 165 that includes a primary winding 170 and a secondary winding 175 and both 170, 175 are wound around a common core 180. The primary side 172 of the flyback transformer 165 is the primary winding 170 and the secondary side 176 of the flyback transformer 165 is the secondary winding 175. In the illustrated flyback transformer 165, the primary winding 170 and the secondary winding 175 are wired out of phase so the primary 140 and second currents 150 do not flow simultaneously. The primary winding 170 with a turns ratio of Np and secondary winding 175 with a turns ratio of Ns can be viewed as the primary inductor 170 (Lp) having a primary current (Ip) 140 and the secondary inductor 175 (Ls) having a secondary current (Is) 150 during their respective conduction periods. The primary switch 190 has an input 191, an output 192 and a control 193. The input 191 of the primary switch 190 is coupled to the input voltage 110, the output 192 is coupled to the primary winding 170 and the control 193 is coupled to an output 251 of the switching control circuit 250. The synchronous rectifier switch 195 has an input 196, an output 197 and a control 198. The input 196 of the synchronous rectifier switch 195 is coupled to the secondary winding 175, the output 197 is connected to the output capacitor 185 and the control 198 is connected to an output 255 of the switching control circuit 250. The illustrated prestart control circuit 200 has two inputs 201, 204 and an output 202. One input 201 of the prestart control circuit 200 is connected to the primary-side-voltage-measure location 130 and another input 204 of the prestart control circuit 200 is connected to the output 221 of the switching control circuit 250. The output 202 of the prestart control circuit 200 is coupled to the input 259 of the switching control circuit 250. In another embodiment, the primary side 172 may have an auxiliary winding.

The prestart control circuit 200 controls the operation of the switching power converter 100 by requiring the switching power converter 100 to execute the PRESTART operation before the normal operation of the switching power converter 100. PRESTART operation is described below.

During normal operations, the primary switch 190 and the synchronous rectifier switch 195 operate in opposition to each other responsive to the output 251, 255 of the switching control circuit 250 such that when the primary switch 190 is CLOSED and the synchronous rectifier switch 195 is OPEN, the flyback transformer 165 is charging responsive to the application of the input voltage 110. When the primary switch 190 is CLOSED and the synchronous rectifier switch 195 is OPEN, the primary side 172 of the flyback transformer 165 is directly connected to the input voltage 110. The primary side current 140 and the flyback transformer 165's magnetic flux increases, storing energy in the flyback transformer 165. Since the synchronous rectifier switch 195 is OPEN, there is no current flow out of the flyback transformer 165 to the secondary side 176 and the output capacitor 185 supplies energy for the output voltage 120. However, when the primary switch 190 is OPEN and the synchronous switch is CLOSED, the only path for the flyback transformer's current is through the primary side 172 of the flyback transformer 165. This causes a reflected voltage 135 to appear on the primary side 172 that is proportionate to the output voltage 120 of the switching power converter 100. After the instance of transition, the mutual inductance of the windings causes the current to, transfer the energy to the secondary side 176 and now with the synchronous rectifier switch 195 CLOSED the energy recharges the output capacitor 185 and supplies the output voltage 120.

However, during PRESTART operation, the prestart control circuit 200 commands the switching control circuit 250 to create waveforms 252, 256 that drive the primary switch 190 and synchronous rectifier switch 195 independently of each other allowing measurement of the reflected voltage 135 on the primary side 172 without inducing excessive current in the flyback transformer 165. The reflected voltage 135 is proportionate to the output voltage 120 of the switching power converter 100. The primary switch 190 is held OPEN to restrict any additional charging of the flyback transformer 165. The synchronous rectifier switch 195 is pulsed between OPEN and CLOSED with a duty cycle 257 set to reset the flux to zero in the coupled inductor 165 when the synchronous rectifier switch 195 is OPEN. When the synchronous rectifier switch 195 is OPEN, the secondary current 150 built up in the secondary inductor 175 causes the voltage on the synchronous rectifier switch 195 to flyback to a negative voltage. In the case of this example, the negative voltage is limited to the input voltage 110 (Vin) when referred to the primary side 172 due to the body diode of the primary switch 190 conducting. The period of time the synchronous rectifier switch 195 is CLOSED is limited to prevent secondary current 150 from buildup of secondary current 150 in the secondary inductor 175 or the extraction of energy from the output capacitor 185. Allowing the coupled inductors 165, to reset between pulses, the peak current is equal to the reflected voltage 135 multiplied by the time the synchronous rectifier switch 195 is CLOSED divided by the secondary inductor 175's magnetizing inductance.

While the switching control circuit 250 holds the primary switch 190 OPEN and the synchronous rectifier switch 195 is CLOSED, the prestart control circuit 200 measures the reflected voltage 135 on the primary side 172 at the primary-side-voltage-measure location 130. The reflected voltage 135 (Vreflected) is proportionate to the output voltage 120 as shown in the following equation:

$$Vreflected = Vout * \frac{Np}{Ns}.$$

The prestart control circuit 200 uses the reflected voltage 135 to determine the initial duty cycle value (Dinitial) of the switching power converter 100 from the equation:

$$Dinitial = \frac{1}{1 + \frac{Ns * Vin}{Np * Vreflected}}$$

Once established, the prestart control circuit 200 provides the initial duty cycle to the switching control circuit 250 for the switching power converter 100 to begin normal operation.

Figure 2:
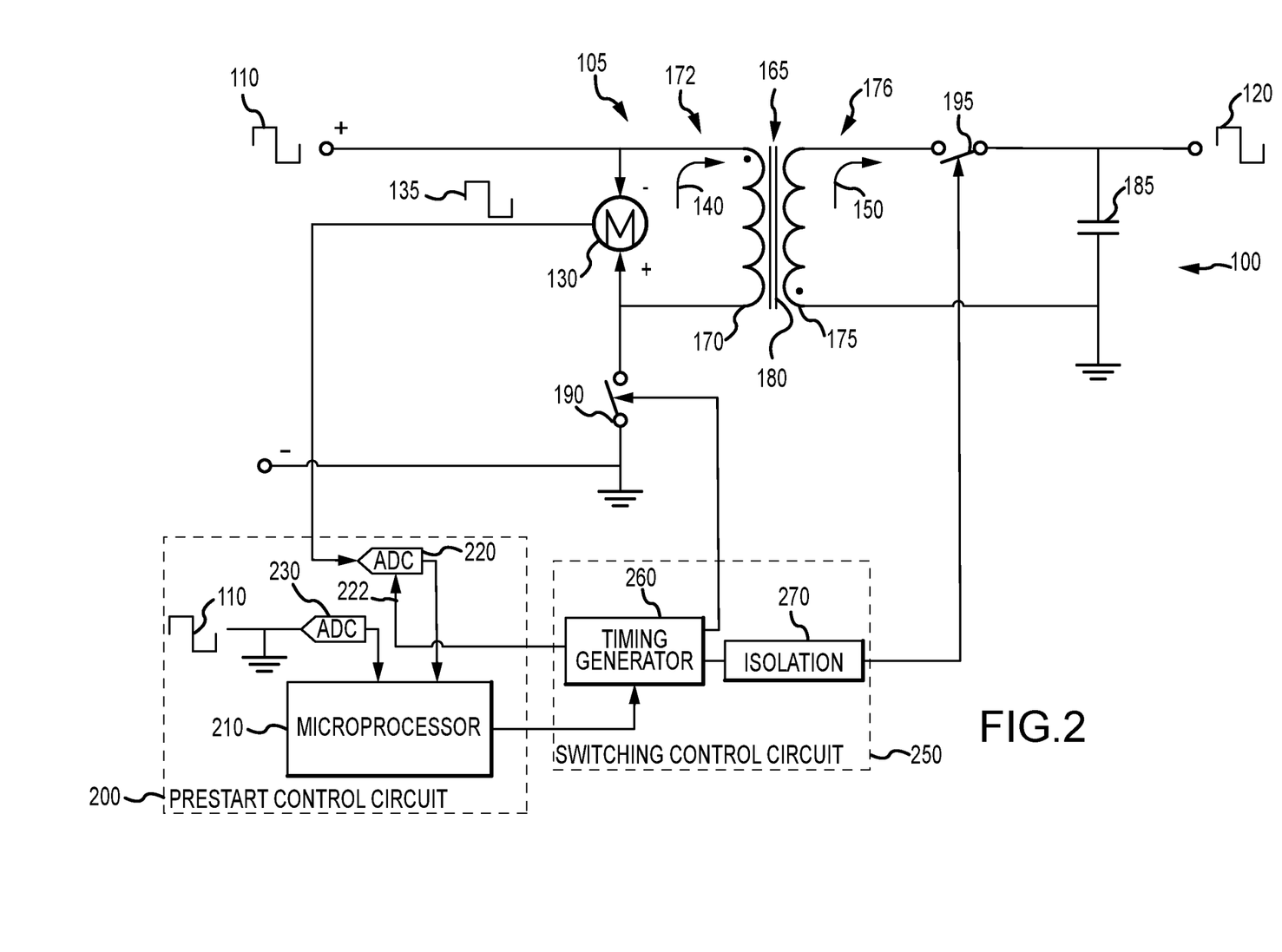
FIG. 2 is a diagram of a switching power converter with a prestart control circuit and a switching control circuit according to one embodiment of the present invention.

FIG. 2 shows the switching power converter 100 of FIG. 1 including the prestart control circuit 200 and the switching control circuit 250 according to one embodiment of the present invention. The prestart control circuit 200 may provide period and duty cycle values to one or more switching control circuits 250 of the switching power converter 100. In one embodiment of the present invention, the prestart control circuit 200 includes a two analog to digital converters 220, 230 and a microprocessor 210. The first analog-to-digital converter 220 measures the reflected voltage 135 at the primary-side-voltage-measure location 130. The first analog to digital convert 220 is selected based on its capability to measure the reflected voltage 135 at a specific time specified by the switching control circuit 250. A trigger pulse 222 created by the switching control circuit 250 that corresponds to the synchronous rectifier switch 195 being CLOSED controls when the first analog-to-digital converter 220 measures the reflected voltage 135. The second analog to digital converter 230 measures the input voltage 110 for use in the initial duty cycle calculation. The microprocessor 210 provides the switching control circuit 250 with a duty cycle and period for a primary switch 190 and a synchronous rectifier switch 195 and the trigger pulse timing 222 for the first analog to digital converter 220. In one embodiment of the present invention, the switching control circuit 250 includes a timing generator 260 and an isolation 270 section. The timing generator 260 uses the duty cycle and period provided by the prestart control circuit 200 to generate a waveform that controls the primary switch 190 and to trigger 222 the first analog to digital converter 220. The switching control circuit 250 further isolates the waveform to control the synchronous rectifier switch 195 as is necessary for the switching power converter 100. In one embodiment, the period of the waveform is set to limit the time the synchronous rectifier switch is CLOSED to prevent damage to the energy storage section. In another embodiment, the period of the waveform is set to limit the energy storage current to a maximum value. This maximum value may be set to prevent damage to the energy storage section or surrounding circuit components.

Further, in FIG. 2, during PRESTART operation, the prestart control circuit 200 commands the switching control circuit 250 to drive the primary switch 190 OPEN; the switching control circuit 250 pulses the synchronous rectifier switch 195 CLOSED which briefly causes the reflected voltage 135 to appear at the primary-side-voltage-measure location 130. Since the reflected voltage 135 is only present at the primary-side-voltage-measure location 130 when the synchronous rectifier switch 195 is CLOSED, the first analog to digital converter 220 measures the reflected voltage 135 at the specific time the synchronous rectifier switch 195 is CLOSED. The CLOSED time of the synchronous rectifier switch 195 is limited in order to prevent excessive secondary current 150 from building up in the secondary inductor 175. The second analog to digital converter 230 measures the input voltage 110. Once the reflected voltage 135 and the input voltage 110 are measured, the initial duty cycle can be calculated. In the illustrated flyback converter 105, the primary-side-voltage-measure location 130 is located across the primary winding. In another embodiment of the switching power converter, the primary-side-voltage-measure location 130 may be across an auxiliary winding.

Figure 3A:
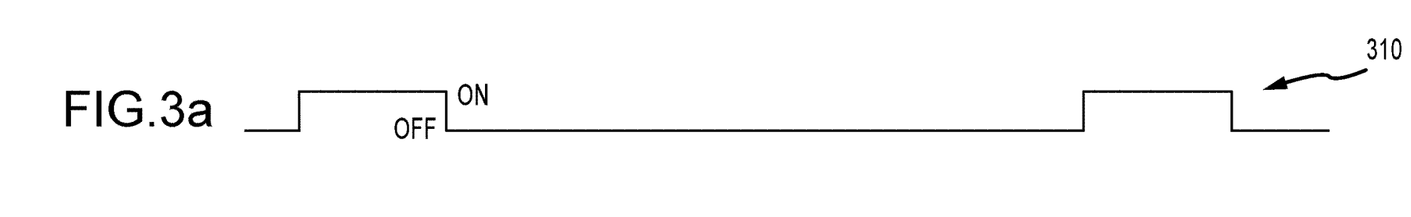
FIGS. 3a and 3b are waveform diagrams illustrating the normal operation of a switching power converter of FIG. 2 according to one embodiment of the present invention.
Figure 3B:
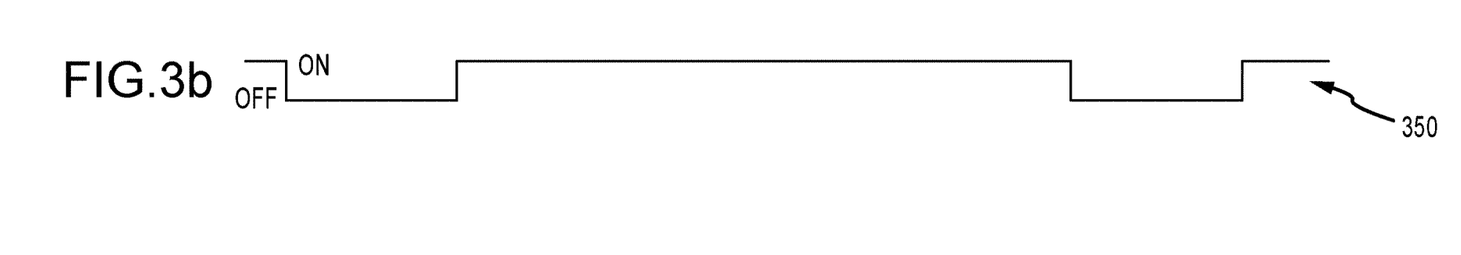
Figure 4A:
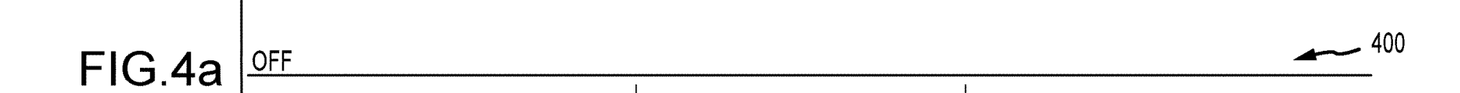
FIGS. 4a through 4c are waveform diagrams illustrating PRESTART operation of a switching power converter of FIG. 2 according to one embodiment of the present invention.
Figure 4B:
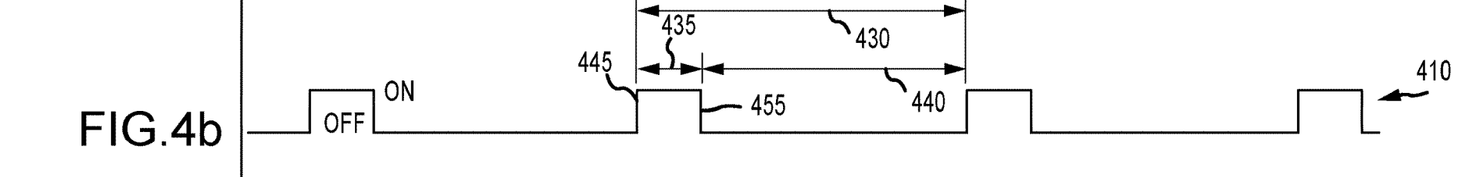
Figure 4C:
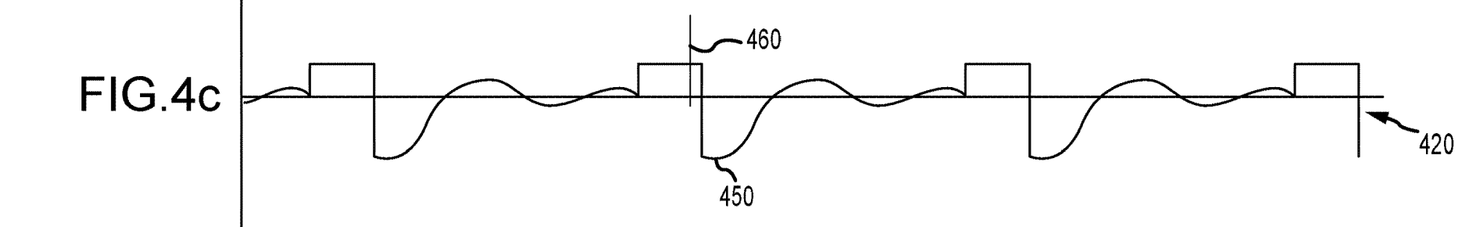

FIG. 3a represents the waveform 310 provided to the primary switch from the switching control circuit during normal operation. FIG. 3b represents the waveform 350 provided to the synchronous rectifier switch from the switching control circuit during normal operation. As shown in FIG. 3a and FIG. 3b, during normal operation the primary switch and the synchronous rectifier switch operate in opposition to each other responsive to the output of the switching control circuit such that when the primary switch is CLOSED, and the synchronous rectifier switch is OPEN Considering the implementation of the prestart control circuit 200 of FIG. 2 and the reference numbers therein, the PRESTART operation of the switching power converter 100 is now described with reference to FIGS. 4a, 4b, and 4c. FIG. 4a represents the waveform 400 provided to the primary switch 190 by the switching control circuit 250 during PRESTART operation. FIG. 4b represents the waveform 410 provided to the synchronous rectifier switch 195 by the switching control circuit 250 during PRESTART operation. FIG. 4c represents the waveform 420 that appears at the primary-side-voltage-measure location 130 and illustrates the reflected voltage 135. As shown in FIG. 4A, during PRESTART operation the primary switch 190 is a logic '0' indicating it is OPEN. As shown in FIG. 4B, one prestart control circuit cycle (Tsr_per) 430 is split into two parts—the time (Tsr_on) 435 the synchronous rectifier switch 195 is CLOSED and the time (Tsr_off) 440 the synchronous rectifier switch 195 is OPEN. As shown in FIG. 4b, Tsr_on 435 begins when the switching control circuit 250 commands the synchronous rectifier switch 195 to a logic 1 "CLOSED". Tsr_on 435 of the synchronous rectifier switch 195 is limited in order to prevent excessive secondary current 150 from building up in the inductance of the coupled secondary inductor 175. As shown in FIG. 4c, reflected voltage 135 at the primary-side-voltage measure location 130 is measured 460 when the synchronous rectifier switch 195 is CLOSED a logic 1 445. As shown in FIGS. 4b and 4c, when the synchronous rectifier switch 195 is OPEN 455, the secondary current 150 built up in the coupled secondary inductor 175 causes the voltage on the synchronous rectifier switch 195 to flyback to a negative voltage 450. In the case of this example, the voltage will be limited to input voltage when referred to the primary due to the body diode of the primary switch 190 conducting.

Figure 5:
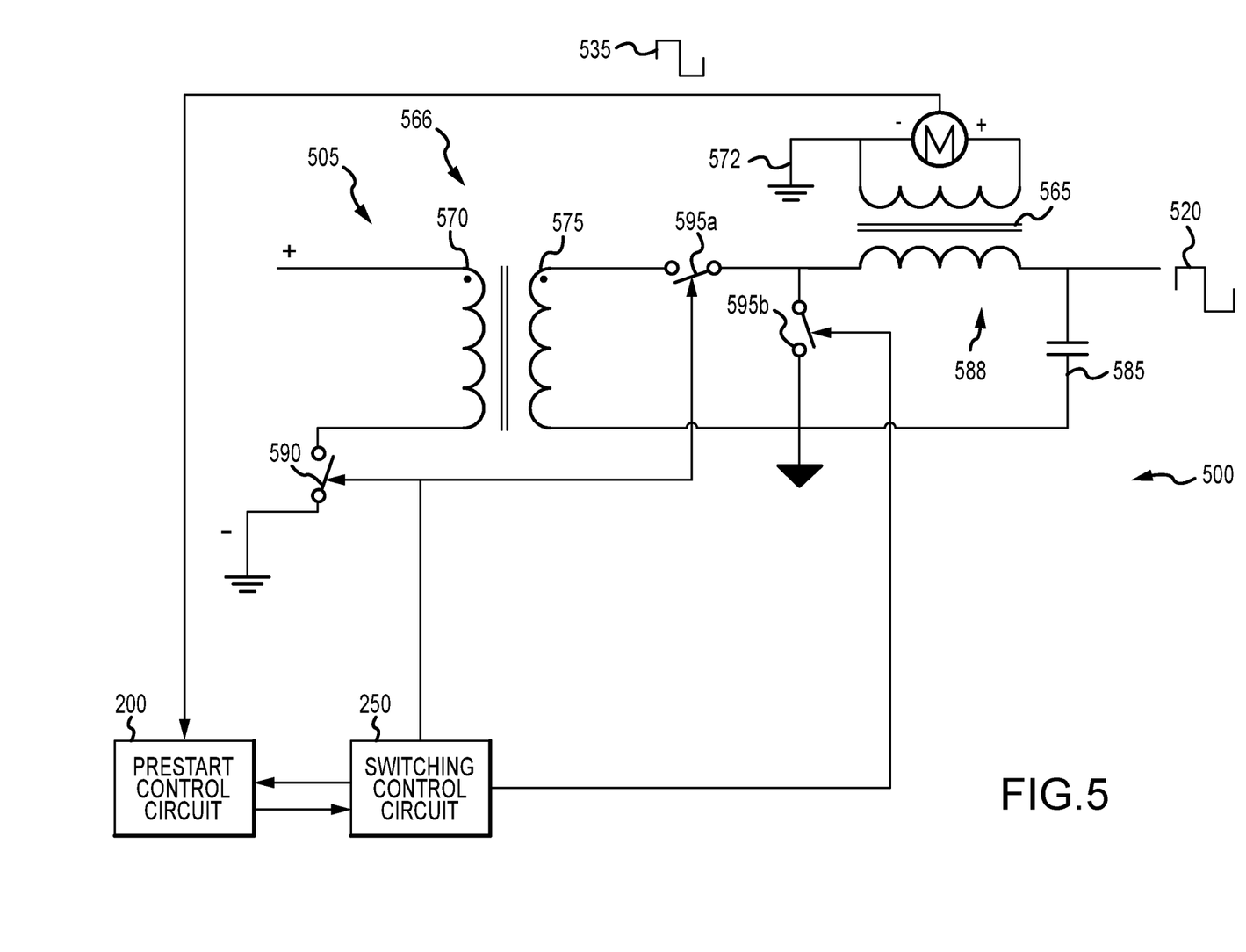
FIG. 5 is a diagram of a switching power converter according to another embodiment of the present invention.

The prestart control circuit 200 may be employed for any switching power converter topology utilizing synchronous rectifiers. For example, FIG. 5 is a schematic of a switching power converter 500 topology commonly referred to as a forward converter 505 including the prestart control circuit 200. The forward converter 505 of FIG. 5 includes a forward rectifier switch 595a and a synchronous rectifier switch 595b. The forward rectifier switch 595a rectifies the voltage across the secondary winding 575 and the synchronous rectifier switch 595b acts as the freewheeling rectifier. An output filter 588, comprising the output capacitor 585 and a coupled inductor 565 filters the output voltage 520. During PRESTART operation, the prestart control circuit 200 measures the reflected voltage 535 that appears on the primary side 572 that is proportionate to the output voltage 520 of the switching power converter 500 and establishes an initial value for the duty cycle of the switching control circuit 250. In a forward converter 505, energy is transferred from the primary winding 570 to the secondary winding 575 of the transformer 566 during the CLOSED period of the primary switch 590. The operation of forward converters is known in the art and, therefore, not described herein.

The flyback converter and forward converters shown previously are examples of the types of isolated switching power converter that may employ the prestart control circuit and associated methods of the present invention. As stated previously, any switching power converter topology utilizing synchronous rectification may employ the prestart control circuit method. This includes, but is not limited to; buck converters, boost converters, single ended and double-ended converters, half bridge and full bridge converters, integrated forward/flyback converter, etc. For example, in FIG. 5, the forward converter circuit components can be replaced with a buck converter circuit components and the switching power converter would be a non-isolated power converter with the prestart control circuit. In addition, the prestart control circuit may be used to control multiple synchronous rectifier switches in, for example, interleaved or multi-phased converters.

The above paragraphs implementing a prestart control circuit that measures a reflected voltage on the primary side that is proportionate to the output voltage of the switching power converter and establishes an initial duty cycle value of the switching control circuit for normal operation using the reflected voltage is one possible usage of the measured reflected voltage. Additionally, the reflected voltage could be used for multiple things including error checking, overvoltage protection, frequency synchronization with load clocks, power sequencing among multiple supplies, load sharing for parallel output operation, average current-mode control of output current, load-current limiting and driving additional synchronous rectifier switches or primary switches.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A switching power converter comprising:
an energy storage section with a primary side and a secondary side that are isolated from each other, said energy storage section responsive to a selective application of an input voltage to the primary side of the switching power converter to produce an energy that provides an output voltage on the secondary side of the switching power converter;
a switching control circuit configured to produce a waveform that has a period and a duty cycle, said duty cycle set based on a value of the output voltage, the input voltage or the energy produced by the energy storage section;
a primary switch and a synchronous rectifier switch that during normal operation switch in opposition to each other responsive to the waveform such that when the primary switch is CLOSED and the synchronous rectifier switch is OPEN the energy storage section is charging and when the primary switch is OPEN and the synchronous rectifier switch is CLOSED the energy storage section is discharging;
wherein during PRESTART operation the primary switch and the synchronous rectifier switch are responsive to the waveform such that the primary switch is held OPEN and the synchronous rectifier switch is pulsed between OPEN and CLOSED; and
a prestart control circuit that during PRESTART operation when the synchronous rectifier switch is CLOSED measures a reflected voltage on the primary side of the switching power converter that is proportionate to the output voltage on the secondary side of the switching power converter, and establishes an initial duty cycle value of the switching control circuit for normal operation using the reflected voltage.

2. The switching power converter of claim 1, wherein the switching control circuit includes a pulse width modulator.

3. The switching power converter of claim 1, wherein the primary switch, the synchronous rectifier switch and the energy storage section are configured as a forward converter.

4. The switching power converter of claim 1, wherein the primary switch, the synchronous rectifier switch and the energy storage section are configured as a flyback converter.

5. The switching power converter of claim 1, wherein the primary switch, the synchronous rectifier switch and the energy storage section are configured as a buck converter.

6. The switching power converter of claim 1, wherein the primary switch, the synchronous rectifier switch and the energy storage section are configured as a boost converter.

7. The switching power converter of claim 1, wherein the period of the waveform is set to limit the time the synchronous rectifier switch is CLOSED to prevent damage to the energy storage section.

8. The switching power converter of claim 1, wherein the energy storage section has an energy storage current and the period of the waveform is set to limit the energy storage current to a maximum value.

9. The switching power converter of claim 1, wherein the primary side has a primary winding and the prestart control circuit measures the reflected voltage across the primary winding.

10. The switching power converter of claim 1, wherein the primary side has a primary winding and an auxiliary winding and the prestart control circuit measures the reflected voltage across the auxiliary winding.

11. A method of establishing an initial duty cycle of a switching power converter having an energy storage section with a primary side and a secondary side that are isolated from each other, said energy storage section responsive to an input voltage applied to the primary side to produce an energy that provides an output voltage on the secondary side, the method comprising:
   during PRESTART operation, applying a waveform having a period and a duty cycle to OPEN a primary switch and to pulse a synchronous rectifier switch between OPEN and CLOSED;
   measuring a reflected voltage on the primary side that is proportionate to the output voltage on the secondary side when the synchronous rectifier switch is CLOSED; and
   using the reflected voltage to establish an initial duty cycle value for driving the switching power converter during normal operation.

12. The method of claim 11, wherein the switching power converter further comprises the primary switch, the synchronous rectifier switch and the energy storage section configured as a flyback converter with the energy storage section is configured as a flyback transformer with the primary side having a primary current and the secondary side having a secondary current.

13. The method of claim 12, wherein the duty cycle and period of the waveform is set to reset the secondary current to zero amperes when the synchronous rectifier switch is OPEN.

14. The method of claim 12, wherein the period of the waveform is set to limit the pulse when the synchronous rectifier switch is CLOSED to prevent the secondary current from damaging the flyback transformer.

15. The method of claim 12; wherein the energy storage section has an energy storage current and the period of the waveform are set to limit the energy storage current to a maximum value.

16. The method of claim 11, wherein the switching power converter further comprises the primary switch, the synchronous rectifier switch and the energy storage section configured as a forward converter.

17. The method of claim 11, wherein the switching power converter further comprises the primary switch, the synchronous rectifier switch and the energy storage section configured as a buck converter.

18. The method of claim 11, wherein the switching power converter further comprises the primary switch, the synchronous rectifier switch and the energy storage section configured as a boost converter.

19. A method of measuring a reflected voltage that is proportionate to an output voltage of a switching power converter having an energy storage section with a primary side and a secondary side that are isolated from each other, said energy storage section responsive to an input voltage applied to the primary side to produce an energy that provides the output voltage on the secondary side, the method comprising:
   during PRESTART operation, applying a waveform having a period and a duty cycle to OPEN a primary switch and to pulse a synchronous rectifier switch between OPEN and CLOSED; and
   measuring a reflected voltage on the primary side that is proportionate to the output voltage on the secondary side when the synchronous rectifier switch is CLOSED.

20. The method of claim 19, wherein the output voltage of the switching power converter is unknown.

21. The method of claim 19, further comprising using the reflected voltage to establish parameters for the switching power converter.

22. The method of claim 19, further comprising using the reflected voltage to establish parameters for the switching control circuit.

23. The method of claim 19, further comprising using the reflected voltage to establish parameters for the prestart control circuit.

24. The method of claim 19, further comprising using the reflected voltage for switching power converter error checking, overvoltage protection, frequency synchronization with load clocks, power sequencing among multiple supplies, load sharing for parallel output operation, average current-mode control of output current, load-current limiting and driving additional synchronous rectifier switches or primary switches.

* * * * *

UNITED STATES PATENT AND TRADEMARK OFFICE
CERTIFICATE OF CORRECTION

| | | |
|---|---|---|
| PATENT NO. | : 10,924,020 B1 | Page 1 of 1 |
| APPLICATION NO. | : 16/527897 | |
| DATED | : February 16, 2021 | |
| INVENTOR(S) | : Perry et al. | |

It is certified that error appears in the above-identified patent and that said Letters Patent is hereby corrected as shown below:

On the Title Page

Item [22], after "2019", insert --¶(65) Prior Publication Data
US 2021/0036621 A1 Feb. 4, 2021--

In the Specification

Column 1, Line 59, delete "indcutor" and insert --inductor-- therefor

Column 3, Lines 66-67, after "configuration", insert --.--

Column 8, Line 54, after "OPEN", insert --.--

In the Claims

Column 11, Line 45, Claim 15, delete "claim 12;" and insert --claim 12,-- therefor Signed and Sealed this
Fourth Day of May, 2021

Drew Hirshfeld
*Performing the Functions and Duties of the
Under Secretary of Commerce for Intellectual Property and
Director of the United States Patent and Trademark Office*